(12) United States Patent
Rock, Jr. et al.

(10) Patent No.: US 10,677,223 B2
(45) Date of Patent: Jun. 9, 2020

(54) METHOD OF CUSTOMIZING A WIND TURBINE BEDPLATE VIA ADDITIVE MANUFACTURING

(71) Applicant: General Electric Company, Schenectady, NY (US)

(72) Inventors: Peter Joseph Rock, Jr., Boston, MA (US); Trevor Allen Montre, Everett, WA (US); Aaron Janicz, Greenville, SC (US); Matteo Bellucci, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 59 days.

(21) Appl. No.: 16/132,657

(22) Filed: Sep. 17, 2018

(65) Prior Publication Data

US 2020/0088170 A1      Mar. 19, 2020

(51) Int. Cl.
*F03D 13/20* (2016.01)
*F03D 80/80* (2016.01)
*B33Y 80/00* (2015.01)
*B33Y 10/00* (2015.01)

(52) U.S. Cl.
CPC ............ *F03D 13/20* (2016.05); *F03D 80/88* (2016.05); *B33Y 10/00* (2014.12); *B33Y 80/00* (2014.12); *F05B 2230/21* (2013.01); *F05B 2230/31* (2013.01); *F05B 2240/912* (2013.01)

(58) Field of Classification Search
None
See application file for complete search history.

(56) References Cited

U.S. PATENT DOCUMENTS

| 10,495,210 B2* | 12/2019 | Hasan .................... B33Y 80/00 |
| 2006/0140761 A1* | 6/2006 | LeMieux ................ F03D 7/042 |
| | | 416/61 |
| 2012/0025538 A1 | 2/2012 | Luneau et al. |

(Continued)

FOREIGN PATENT DOCUMENTS

| CN | 102 418 676 B | 9/2013 |
| EP | 2 143 945 A2 | 1/2010 |

(Continued)

OTHER PUBLICATIONS

International Search Report, dated Dec. 9, 2019.

*Primary Examiner* — Michael Lebentritt
(74) *Attorney, Agent, or Firm* — Dority & Manning, P.A.

(57) ABSTRACT

A method for customizing bedplates for a plurality of wind turbines having different loading requirements. The method includes forming a plurality of baseline bodies for the bedplates that includes a near net shape of one of the bedplates. Further, the method includes determining a loading requirement of the bedplates of each of the wind turbines. Moreover, the method includes applying additional material to an exterior surface of the plurality of baseline bodies via an additive manufacturing process so as to customize a structural capacity of each of the bedplates such that the structural capacity of each of the bedplates can withstand the loading requirement for each of the wind turbines. Accordingly, the structural capacity of each of the plurality of baseline bodies may be the same or may be different.

20 Claims, 7 Drawing Sheets

(56) References Cited

U.S. PATENT DOCUMENTS

| | | | |
|---|---|---|---|
| 2012/0029843 A1* | 2/2012 | Byreddy | G05B 23/0221 702/42 |
| 2014/0037456 A1* | 2/2014 | Erno | F03D 80/88 416/244 R |
| 2014/0248123 A1* | 9/2014 | Turner | F03D 7/0292 415/1 |
| 2014/0284926 A1* | 9/2014 | Tirumalai | F03D 7/0204 290/44 |
| 2014/0288855 A1* | 9/2014 | Deshpande | F03D 17/00 702/34 |
| 2014/0314580 A1* | 10/2014 | Lind | F03D 1/065 416/244 R |
| 2015/0069762 A1* | 3/2015 | Mashtare | F16H 57/025 290/55 |
| 2015/0135534 A1* | 5/2015 | Viscome | F03D 13/10 29/889 |
| 2015/0176569 A1* | 6/2015 | Karikomi | G01M 15/14 702/34 |
| 2015/0233357 A1* | 8/2015 | Libergren | F03D 80/88 416/244 R |
| 2015/0369214 A1* | 12/2015 | Herbsleb | F03D 7/022 416/1 |
| 2016/0146186 A1* | 5/2016 | Viscome | F03D 1/0691 416/244 A |
| 2016/0252075 A1* | 9/2016 | Kruger | F03D 7/0292 416/1 |
| 2018/0171978 A1* | 6/2018 | Spruce | G05B 9/02 |
| 2018/0187655 A1* | 7/2018 | Scholte-Wassink | F03D 17/00 |
| 2018/0347543 A1* | 12/2018 | Vadlamudi | F03D 7/0276 |
| 2019/0113021 A1* | 4/2019 | Tomas | F03D 17/00 |
| 2019/0136837 A1* | 5/2019 | Christiansen | F03D 80/88 |
| 2019/0178231 A1* | 6/2019 | Tomas | F03D 17/00 |
| 2019/0219032 A1* | 7/2019 | He | F03D 7/0224 |
| 2019/0292803 A1* | 9/2019 | Meyer | E04H 12/12 |
| 2019/0383359 A1* | 12/2019 | Tesar | F16H 1/206 |

FOREIGN PATENT DOCUMENTS

| | | |
|---|---|---|
| EP | 2 368 653 A2 | 9/2011 |
| GB | 2 521 397 A | 6/2015 |

* cited by examiner

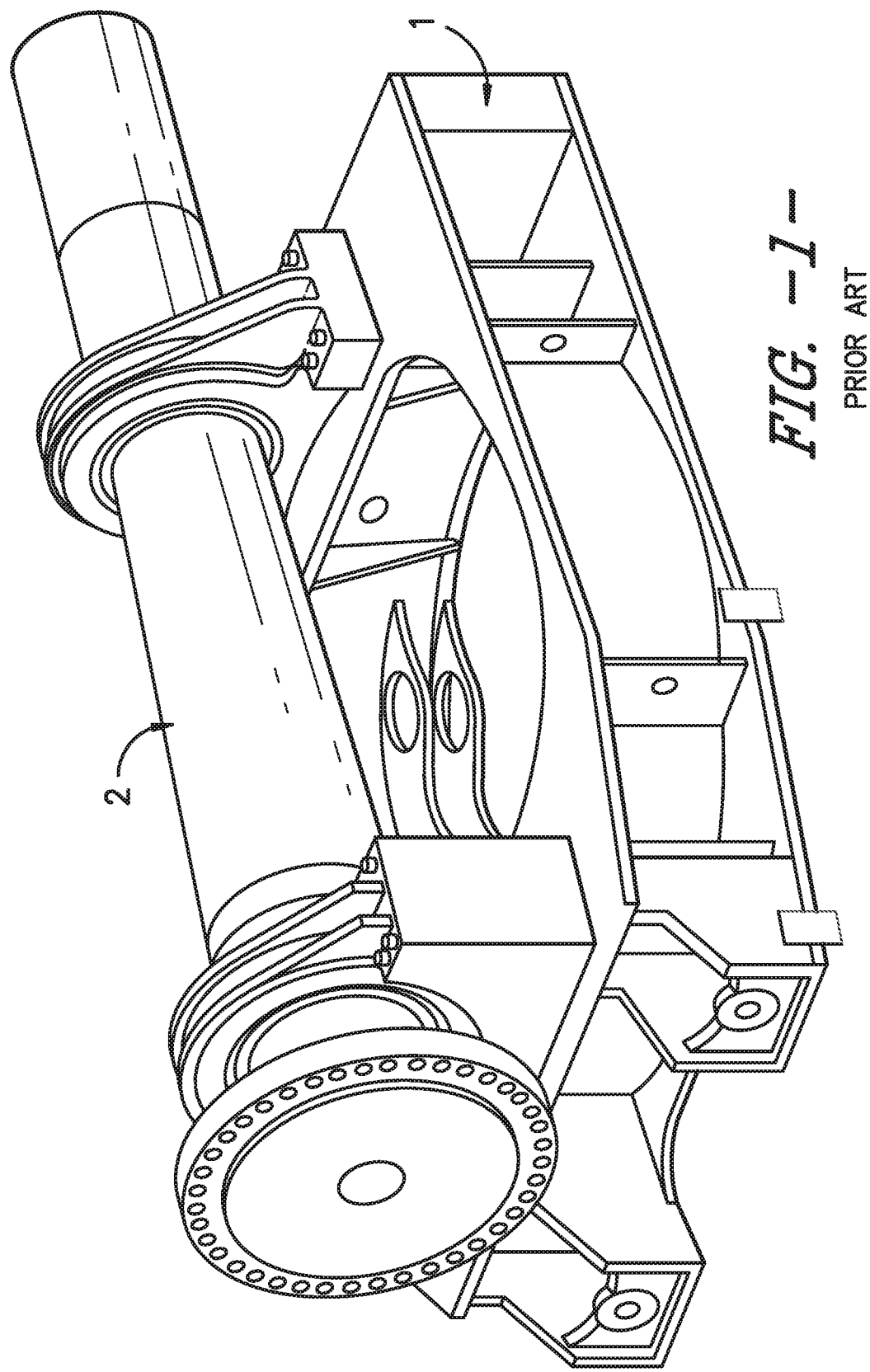
FIG. -1-
PRIOR ART

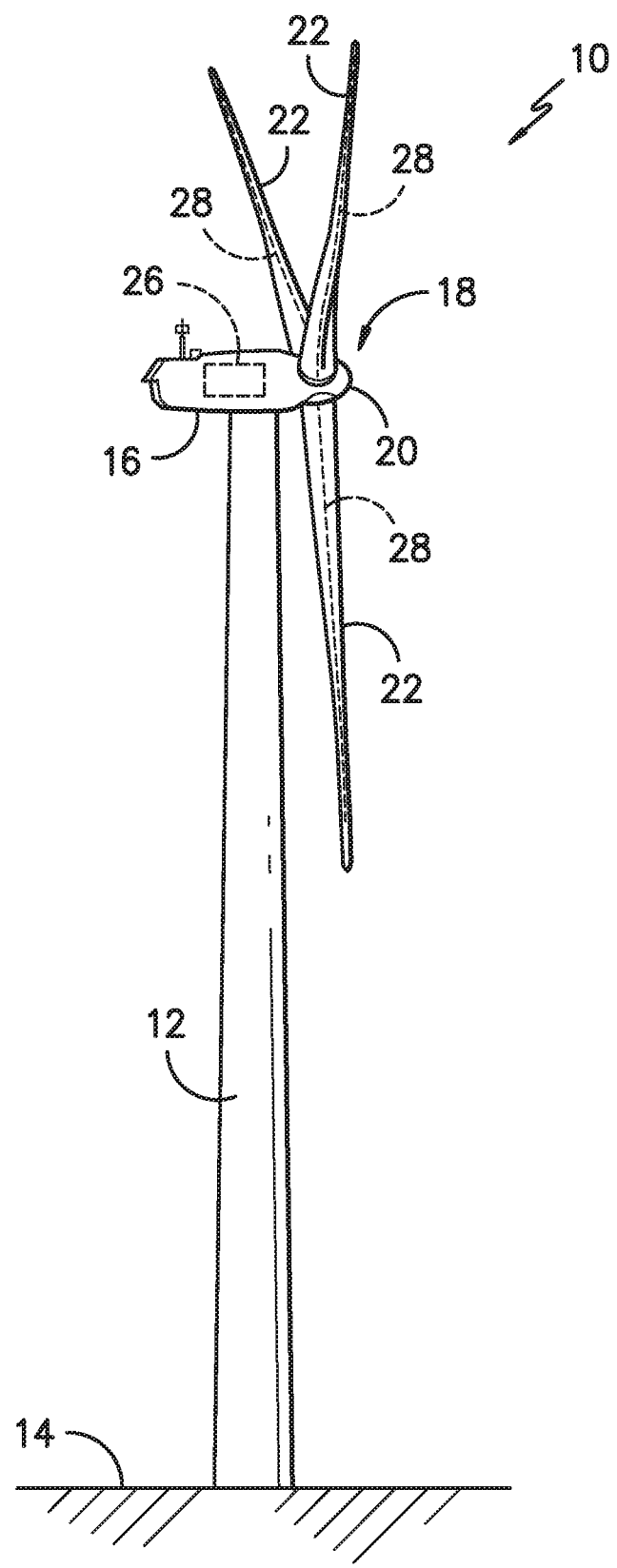
FIG. -2-

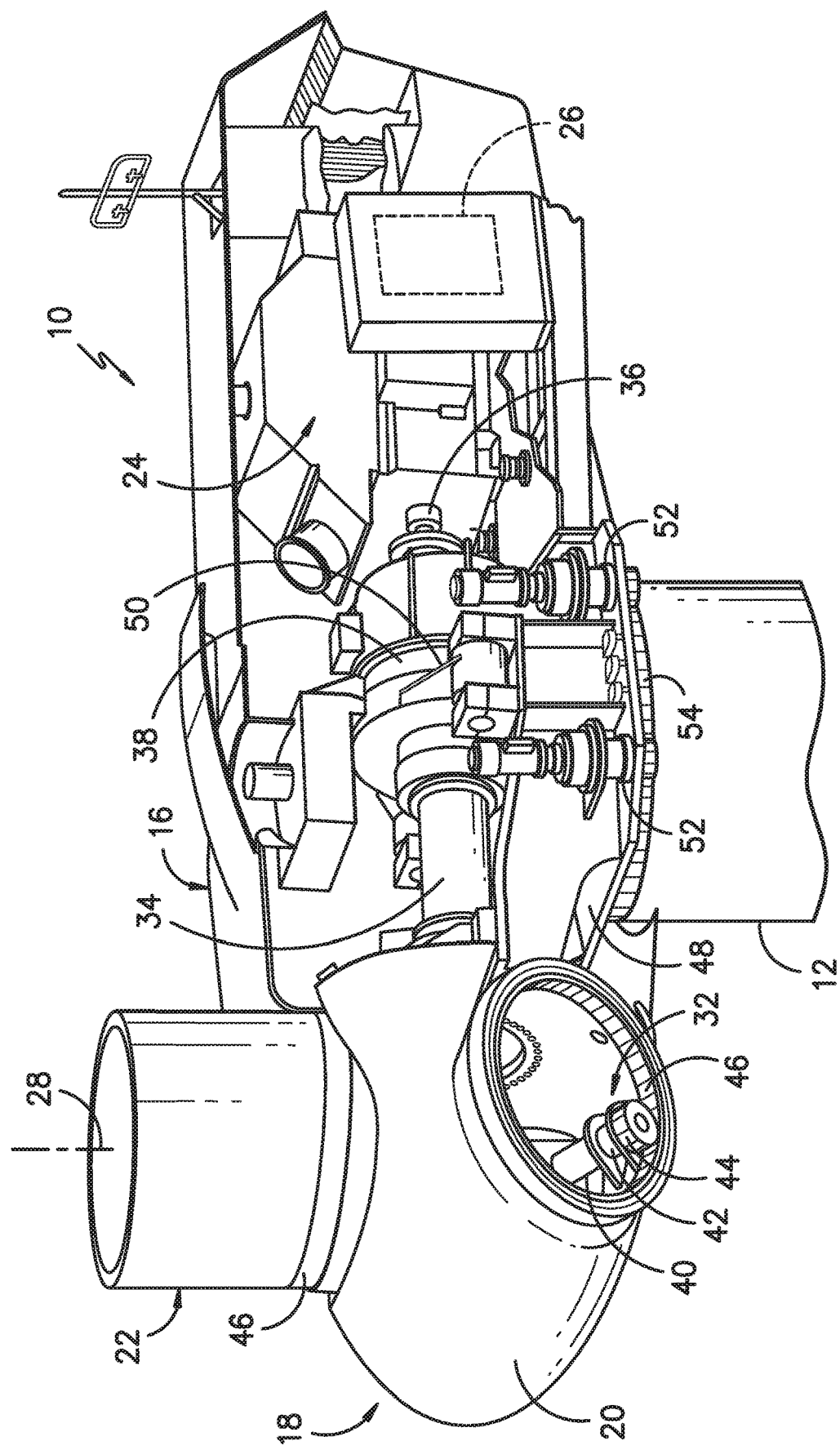
FIG. -3-

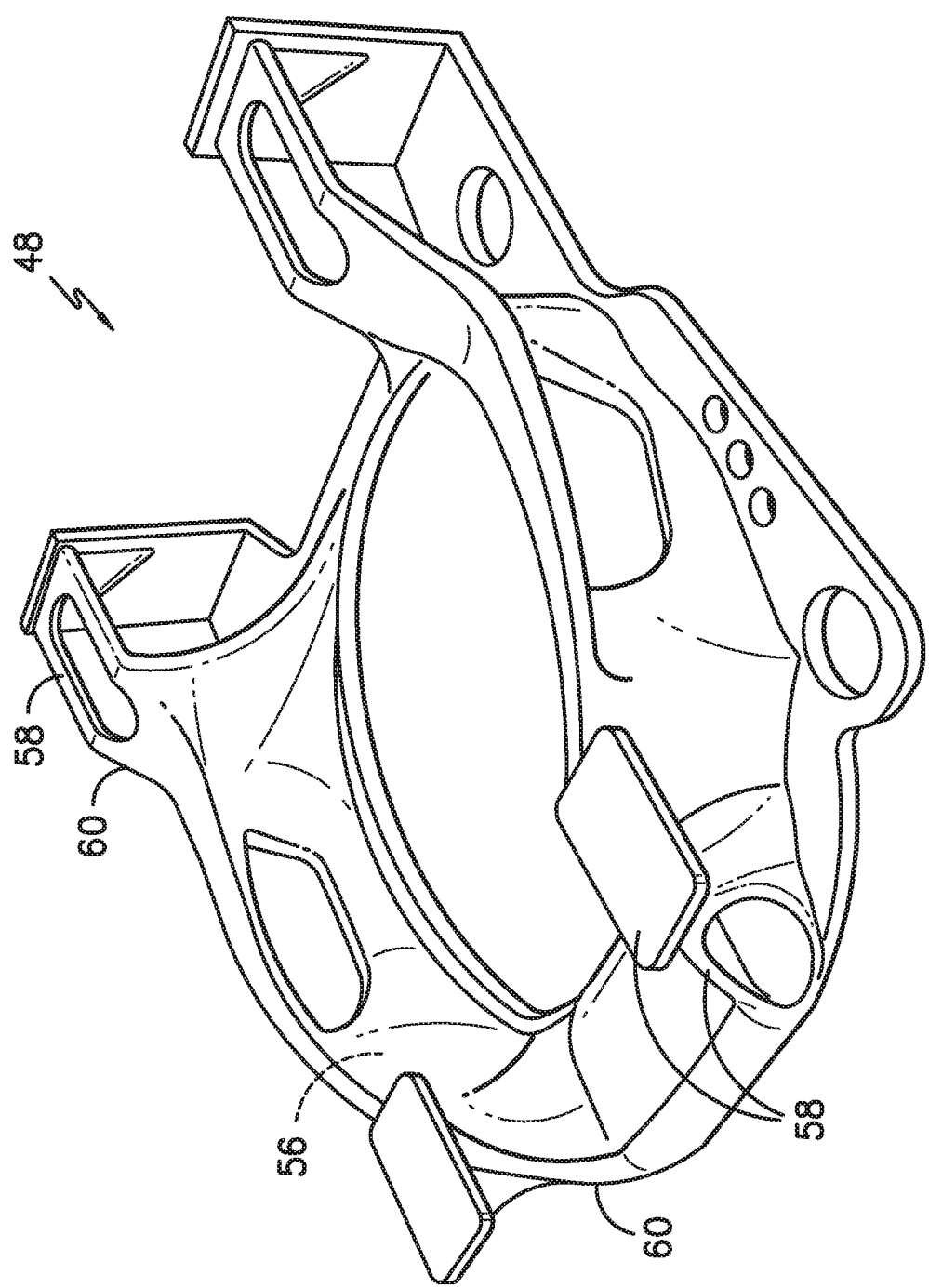
FIG. -4-

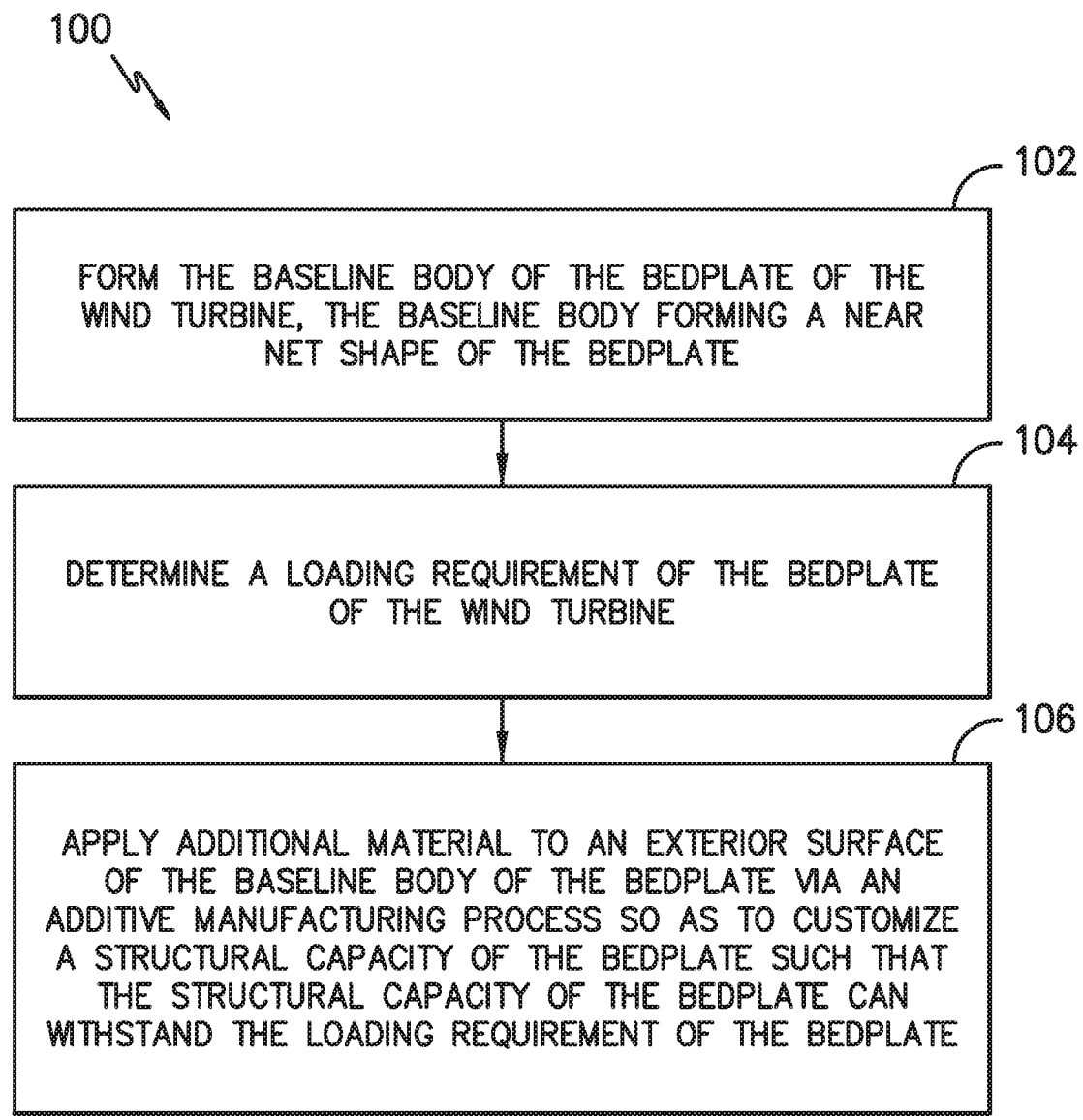
FIG. -5-

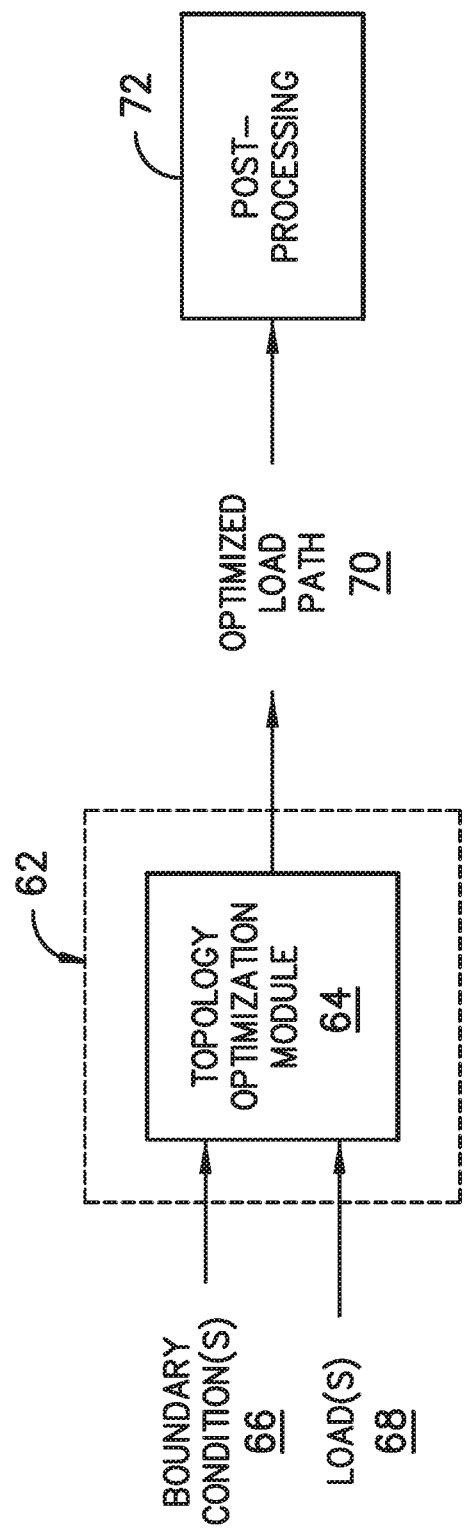
FIG. -6-

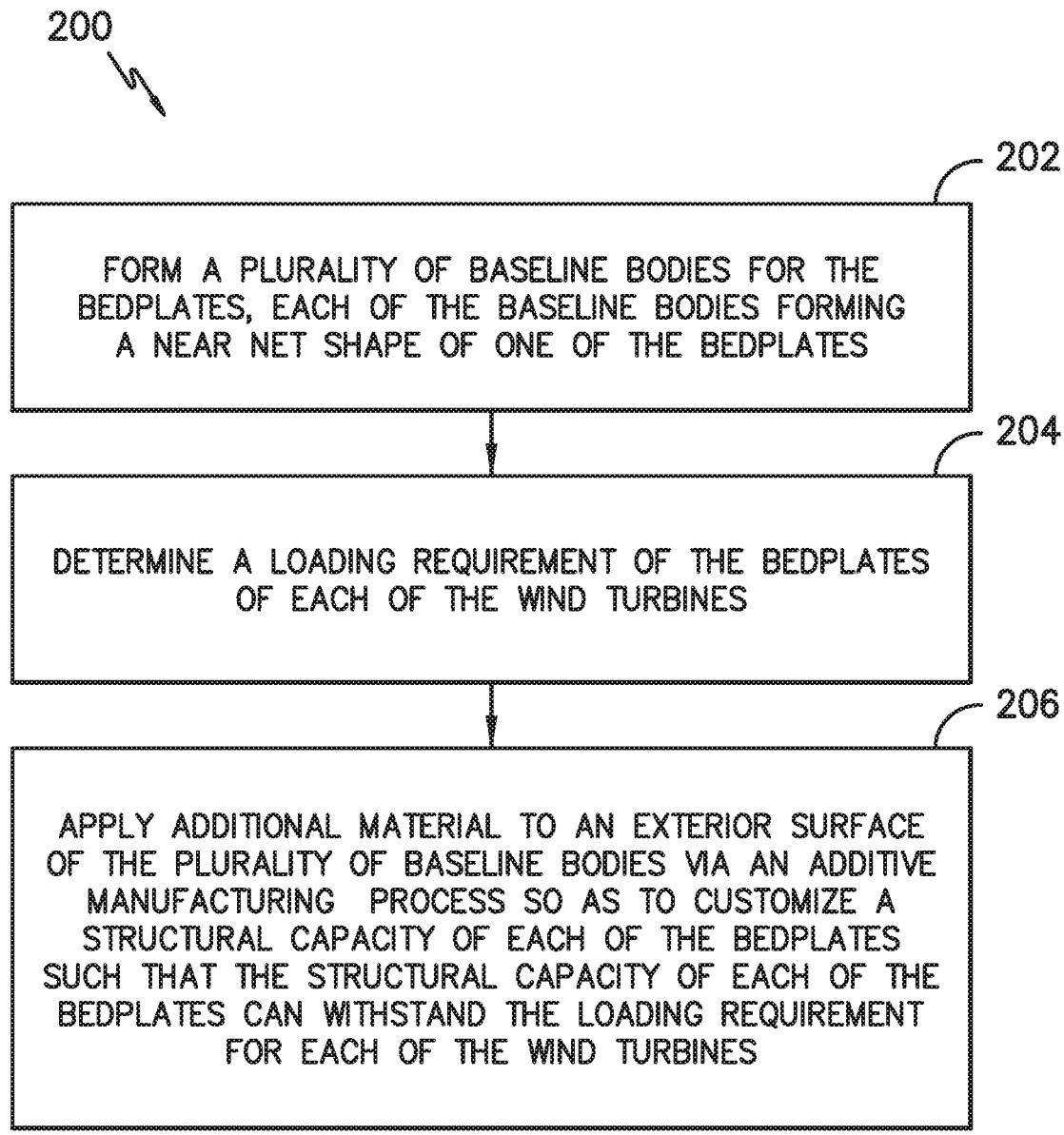
FIG. -7-

METHOD OF CUSTOMIZING A WIND TURBINE BEDPLATE VIA ADDITIVE MANUFACTURING

FIELD

The present disclosure relates in general to wind turbines, and more particularly to methods for customizing wind turbine bedplates via additive manufacturing.

BACKGROUND

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator. In addition, the wind turbine includes a bedplate that supports the various components within the nacelle. The bedplate is the main structural member of the nacelle that reacts the loads from the rotor blades through the tower and to ground.

More specifically, FIG. 1 illustrates a perspective view of one embodiment of a wind turbine bedplate 1 according to conventional construction. As shown, the bedplate 1, at a minimum, supports the main shaft 2 and the gearbox (not shown) of the wind turbine. Thus, the bedplate 1 is designed to transfer the thrust, torque, and bending moments from the main shaft 2 and the gearbox to the tower. In addition, the bedplate 1 is designed using adequate materials and features for supporting internal wind turbine equipment and/or various bolted connections (such as the torque arms, yaw drives, etc.).

Typical wind turbine bedplates are formed via sand casting using ductile cast iron. Thus, the overall shape and design of conventional bedplates is limited by the manufacturing capabilities of the casting process. In addition, wind turbine bedplates are generally designed to handle a variety of wind loading conditions since a given wind turbine model can operate in different environments. As such, many bedplates are over-designed or under-designed depending on the wind conditions of a particular wind turbine site.

Accordingly, an improved bedplate for a wind turbine and method of manufacturing same that addresses the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for customizing bedplates for a plurality of wind turbines having different loading requirements. The method includes forming a plurality of baseline bodies for the bedplates that includes a near net shape of one of the bedplates. Further, the method includes determining a loading requirement of the bedplates of each of the wind turbines. Moreover, the method includes applying additional material to an exterior surface of the plurality of baseline bodies via an additive manufacturing process so as to customize a structural capacity of each of the bedplates such that the structural capacity of each of the bedplates can withstand the loading requirement for each of the wind turbines. Accordingly, the structural capacity of each of the plurality of baseline bodies may be the same or may be different.

In one embodiment, the method may include forming the plurality of baseline bodies for the bedplates via at least one of a casting process or welding. For example, in particular embodiments, the casting process may include pouring a liquid material into molds of the baseline bodies of the bedplates and allowing the liquid material to solidify in the molds so as to form the plurality of baseline bodies of the bedplates. In another embodiment, the method may include forming the plurality of baseline bodies for the bedplates from at least one of steel, cast steel, iron, or ductile iron.

In further embodiments, the step of determining the loading requirement of the bedplates of each of the wind turbines may include receiving, via a topology optimization module programmed in a controller, one or more boundary conditions for the bedplates and determining, via the topology optimization module, an optimized load path for each of the bedplates based on the one or more boundary conditions for the bedplates.

In additional embodiments, the step of applying the additional material to the exterior surface of the plurality of baseline bodies via the additive manufacturing process may include printing one or more structural members at one or more locations on the exterior surface of each of the plurality of baseline bodies to correspond to the optimized load path. As such, the method may include applying the additional material to the exterior surfaces of the plurality of baseline bodies on demand.

In certain embodiments, the additive manufacturing process described herein may include, for example, directed energy deposition, binder jetting, material jetting, or any other suitable additive manufacturing technique. As such, the additional material used in the additive manufacturing process may include a steel alloy, an iron alloy, or combinations thereof or similar.

In another aspect, the present disclosure is directed to a method for manufacturing a bedplate of a wind turbine. The method includes forming a baseline body of the bedplate of the wind turbine that includes a near net shape of the bedplate. The method also includes determining a loading requirement of the bedplate of the wind turbine. Thus, the method includes applying additional material to an exterior surface of the baseline body of the bedplate via an additive manufacturing process so as to customize a structural capacity of the bedplate such that the structural capacity of the bedplate can withstand the loading requirement of the bedplate. It should also be understood that the method may further include any of the additional features and/or steps described herein.

In yet another aspect, the present disclosure is directed to a wind turbine. The wind turbine includes a tower, a nacelle mounted atop the tower, a rotor secured to the nacelle having a rotatable hub and a plurality of rotor blades mounted to the hub and a bedplate positioned within and secured to the nacelle. Further, the bedplate includes a baseline body formed via at least one of casting or welding and one or more areas of additional material applied to an exterior surface thereof via an additive manufacturing process such that a structural capacity of the bedplate is designed to withstand a loading requirement of the bedplate. It should also be understood that the wind turbine may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a bedplate of a wind turbine according to conventional construction;

FIG. 2 illustrates a perspective view of one embodiment of a wind turbine according to the present disclosure;

FIG. 3 illustrates a detailed, internal view of one embodiment of a nacelle of a wind turbine according to the present disclosure;

FIG. 4 illustrates a perspective view of one embodiment of a bedplate of a wind turbine according to the present disclosure;

FIG. 5 illustrates a flow diagram of one embodiment of a method for manufacturing a bedplate of a wind turbine according to the present disclosure;

FIG. 6 illustrates a schematic diagram of one embodiment of a controller for determining an optimized load path for a bedplate of a wind turbine according to the present disclosure; and FIG. 7 illustrates a flow diagram of one embodiment of a method for customizing bedplates for a plurality of wind turbines having different loading requirements according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a method for manufacturing a bedplate of a wind turbine. The method includes forming a lightweight casted bedplate that is capable of meeting the loading requirements for the majority of wind turbine sites, thereby reducing costs and using less material. For the wind turbine sites where additional structure is required due to higher loading, an additive manufacturing process can be used, e.g. to add ribs and/or other structural members to the casted component, thereby enabling the bedplate to withstand higher loads.

Thus, the present disclosure provides many advantages not present in the prior art. For example, the bedplate of the present disclosure can be customized for a particular wind turbine site, thereby avoiding the issue of over-designing the bedplate for a majority of applications. By enabling customization on demand with an additive manufacturing process, the bedplate of the present disclosure can be specifically designed to accommodate higher wind loading environments only when needed.

Referring now to the drawings, FIG. 2 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotation of the rotor 18 to enable kinetic energy to be transferred from the wind into usable mechanical energy, and subsequently, electrical energy. For instance, the hub 20 may be rotatably coupled to an electric generator 24 (FIG. 3) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Referring now to FIG. 3, a simplified, internal view of one embodiment of the nacelle 16 of the wind turbine 10 shown in FIG. 2 is illustrated. As shown, the wind turbine 10 includes the generator 24 housed within the nacelle 16, which is coupled to the rotor 18 for producing electrical power from the rotational energy generated by the rotor 18. For example, as shown, the rotor 18 may include a rotor shaft 34 coupled to the hub 20 for rotation therewith. The rotor shaft 34 may, in turn, be rotatably coupled to a generator shaft 36 of the generator 24 through a gearbox 38 connected to a bedplate support frame 48 by a torque support 50. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 52 communicatively coupled to the controller 26, with each yaw drive mechanism(s) 52 being configured to change the angle of the nacelle 16 relative to the wind (e.g., by engaging a yaw bearing 54 of the wind turbine 10).

Referring now to FIG. 4, a detailed perspective view of one embodiment of the bedplate 48 according to the present disclosure illustrated. As shown, the bedplate 48 includes a baseline body 56 formed via at least one of casting or welding and one or more areas of additional material 58 applied to an exterior surface 60 of the baseline body 56 via an additive manufacturing process such that a structural capacity of the bedplate 48 is designed to withstand a loading requirement of the bedplate 48.

Referring now to FIG. 5, a flow diagram of one embodiment of one embodiment of a method 100 for manufacturing a bedplate of a wind turbine 10 is illustrated. In general, the method 100 will be described herein with reference to the wind turbine 10 and bedplate 48 shown in FIGS. 2 and 3. However, it should be appreciated that the disclosed method 100 may be implemented with wind turbines having any other suitable configurations. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include forming the baseline body 56 of the bedplate 48. As such, the baseline body 56 of the bedplate 48 generally forms a near net shape of the bedplate 48. As used herein, the near net shape generally refers to the part being very close to the final (net) shape, thereby reducing the need for additional manufacturing processing. As such, the near net shape reduces required finishing, such as machining or grinding.

For example, in one embodiment, the method 100 may include forming the baseline body 56 of the bedplate 48 via casting or welding. In such embodiments, the casting process may include pouring a liquid material into a mold of the baseline body 56 of the bedplate 48 and allowing the liquid material to solidify in the mold so as to form the baseline body 56 of the bedplate 48. In another embodiment, the method may include forming the baseline body 56 of the bedplate 48 from steel, cast steel, iron, ductile iron, or any other suitable materials having the desired strength and/or structural characteristics.

Still referring to FIG. 5, as shown at (104), the method 100 may include determining a loading requirement of the bedplate 48 of the wind turbine 10. More specifically, in one embodiment, the loading requirement may be determined via topology optimization. As used herein, topology optimization generally refers to a mathematical method that optimizes material layout within a given design space, for a given set of loads, boundary conditions and constraints with the goal of maximizing the performance of the system. More specifically, as shown in FIG. 6, a schematic diagram of one embodiment of a controller 62 configured to determine the loading requirement for the bedplate 48 is illustrated. As shown, the controller 62 may include a topology optimization module 64 configured to receive one or more boundary conditions 66 or constraints for the bedplate 48 and/or one or more loads 68 (e.g. main shaft loading, torque, thrust, etc.).

It should be understood that the controllers described herein may include one or more processor(s) and associated memory device(s) configured to perform a variety of computer-implemented functions (e.g., performing the methods, steps, calculations and the like and storing relevant data as disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) described herein may also be configured to compute advanced control algorithms and communicate to a variety of Ethernet or serial-based protocols (Modbus, OPC, CAN, etc.). Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 62 to perform the various functions as described herein.

More specifically, in one embodiment, the topology optimization module 64 of the controller 62 may receive a baseline design of the bedplate 48. The baseline design of the bedplate 48, for example, may be an initial potentially over-designed shape. As such, the topology optimization module 64 is configured to simplify the baseline design by simplifying any complex features for meshing. Thus, the simplification of the baseline design of the bedplate 48 is configured to maximize design space while maintaining interfaces. The topology optimization module 64 is then configured to add interfaces (e.g. that correspond to the main shaft 34, torque arms 50, yaw drive mechanisms 52, etc.) and apply the boundary conditions/constraints 66 to the simplified baseline design. Thus, the topology optimization module 64 can determine an optimized load path 70 for the bedplate 48 based on the one or more boundary conditions 66 and/or loads 68 for the bedplate 48. As shown at 72, the optimized load path 70 may also be optionally post-processed, e.g. to smooth surfaces and/or to provide symmetry to the bedplate design.

Thus, referring back to FIG. 5, as shown at (106), the method 100 may include applying additional material 58 to the exterior surface 60 of the baseline body 56 of the bedplate 48 via an additive manufacturing process so as to customize a structural capacity of the bedplate 48 such that the structural capacity of the bedplate 48 can withstand the loading requirement of the bedplate 48. In other words, the method 100 includes using the optimized load path 70 as a roadmap for applying the additional material 58 to the baseline body 56.

As used herein, additive manufacturing generally refers to processes used to create a three-dimensional object in which layers of material are deposited or formed under computer control to create an object. Thus, in certain embodiments, the additive manufacturing process described herein may include, for example, directed energy deposition, binder jetting, material jetting, or any other suitable additive manufacturing technique. Thus, in one embodiment, the additional material 58 may be deposited onto the baseline body 56 of the bedplate 48 layer by layer via a computer numerical control (CNC) device to build up the additional material 58 to form one or more structural members 74 that increase the structural capacity of the bedplate 48. Thus, in one embodiment, the additional material 58 may be applied to the exterior surface 60 of the baseline body 56 by printing one or more structural members 74 at one or more locations on the exterior surface 60 of the baseline body 56 to correspond to the optimized load path. As such, the method 100 may include applying the additional material 58 to the exterior surface 60 of the baseline body 56 of the bedplate 48 on demand. In further embodiments, the additional material 58 used in the additive manufacturing process may include, for example, a steel alloy, an iron alloy, or combinations thereof or similar.

Referring now to FIG. 7, a flow diagram of one embodiment of one embodiment of a method 200 for customizing bedplates for a plurality of wind turbines having different loading requirements is illustrated. In general, the method 100 will be described herein with reference to the wind turbine 10 shown in FIGS. 2 and 3. However, it should be appreciated that the disclosed method 100 may be implemented with wind turbines having any other suitable configurations. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include forming a plurality of baseline bodies 56 for the bedplates 48 that each form a near net shape of one of the bedplates 48. As shown at (204), the method 200 may include determining a loading requirement of the bedplates 48 of each of the wind turbines 10. For example, as mentioned, the topology optimization module 64 is configured to generate an optimized load path for a plurality of bedplates 48. As shown at (206), the method 200 may include applying additional material 58 to an exterior surface 60 of the plurality of baseline bodies 56 via an additive manufacturing process so as to customize a structural capacity of each of the bedplates 48 such that the structural capacity of each of the bedplates 48 can withstand the loading requirement for each of the wind turbines 10. Accordingly, the structural capacity of each of the plurality of baseline bodies 48 may be the same or may be different.

Accordingly, the method 200 is configured to leverage additive manufacturing to customize and augment a baseline casted bedplate design in order to improve the structural capacity of the bedplate, such that it can be used in areas with higher than average loading without designing a completely new bedplate or wind turbine. Thus, additive technology can enable having multiple bedplate designs that are customizable for a given wind turbine site.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for customizing bedplates for a plurality of wind turbines having different loading requirements, the method comprising:
    forming a plurality of baseline bodies for the bedplates, each of the baseline bodies comprising a near net shape of one of the bedplates;
    determining a loading requirement of the bedplates of each of the wind turbines; and,
    applying additional material to an exterior surface of the plurality of baseline bodies via an additive manufacturing process so as to customize a structural capacity of each of the bedplates such that the structural capacity of each of the bedplates can withstand the loading requirement for each of the wind turbines.

2. The method of claim 1, further comprising forming the plurality of baseline bodies for the bedplates via at least one of a casting process or welding.

3. The method of claim 2, wherein the casting process further comprises:
    pouring a liquid material into molds of the baseline bodies of the bedplates; and,
    allowing the liquid material to solidify in the molds so as to form the plurality of baseline bodies of the bedplates.

4. The method of claim 1, further comprising forming the plurality of baseline bodies for the bedplates from at least one of steel, cast steel, iron, or ductile iron.

5. The method of claim 1, wherein determining the loading requirement of the bedplates of each of the wind turbines further comprises:
    receiving, via a topology optimization module programmed in a controller, one or more boundary conditions for the bedplates;
    determining, via the topology optimization module, an optimized load path for each of the bedplates based on the one or more boundary conditions for the bedplates.

6. The method of claim 5, wherein applying the additional material to the exterior surface of the plurality of baseline bodies via the additive manufacturing process further comprises printing one or more structural members at one or more locations on the exterior surface of each of the plurality of baseline bodies to correspond to the optimized load path.

7. The method of claim 1, further comprising applying the additional material to the exterior surfaces of the plurality of baseline bodies on demand.

8. The method of claim 1, wherein the additive manufacturing process comprises at least one of directed energy deposition, binder jetting, or material jetting.

9. The method of claim 1, wherein the additional material comprises at least one of a steel alloy or an iron alloy.

10. The method of claim 1, wherein the structural capacity of each of the plurality of baseline bodies is different.

11. A method for manufacturing a bedplate of a wind turbine, the method comprising:
    forming a baseline body of the bedplate of the wind turbine, the baseline body comprising a near net shape of the bedplate;
    determining a loading requirement of the bedplate of the wind turbine; and,
    applying additional material to an exterior surface of the baseline body of the bedplate via an additive manufacturing process so as to customize a structural capacity of the bedplate such that the structural capacity of the bedplate can withstand the loading requirement of the bedplate.

12. The method of claim 11, further comprising forming the baseline body of the bedplate via at least one of a casting process or welding.

13. The method of claim 12, wherein the casting process further comprises:
pouring a liquid material into a mold of the baseline body of the bedplate; and,
allowing the liquid material to solidify in the mold so as to form the baseline body of the bedplate.

14. The method of claim 11, further comprising forming the baseline body for the bedplate from at least one of steel, cast steel, iron, or ductile iron.

15. The method of claim 11, wherein determining the loading requirement of the bedplate of the wind turbine further comprises:
receiving, via a topology optimization module programmed in a controller, one or more boundary conditions for the bedplate;
determining, via the topology optimization module, an optimized load path for the bedplate based on the one or more boundary conditions for the bedplate.

16. The method of claim 15, wherein applying the additional material to the exterior surface of the baseline body via the additive manufacturing process further comprises printing one or more structural members at one or more locations on the exterior surface of baseline body to correspond to the optimized load path.

17. The method of claim 11, further comprising applying the additional material to the exterior surface of the baseline body on demand.

18. The method of claim 11, wherein the additive manufacturing process comprises at least one of directed energy deposition, binder jetting, or material jetting.

19. The method of claim 11, wherein the additional material comprises at least one of a steel alloy or an iron alloy.

20. A wind turbine, comprising:
a tower;
a nacelle mounted atop the tower;
a rotor secured to the nacelle, the rotor comprising a rotatable hub and a plurality of rotor blades mounted to the hub; and,
a bedplate positioned within and secured to the nacelle, the bedplate comprising a baseline body formed via at least one of casting or welding and one or more areas of additional material applied to an exterior surface thereof via an additive manufacturing process such that a structural capacity of the bedplate is designed to withstand a loading requirement of the bedplate.

* * * * *